ADAMS & WORTHINGTON.
Dry Amalgamator.
No. 2,028. Reissued July 18, 1865.
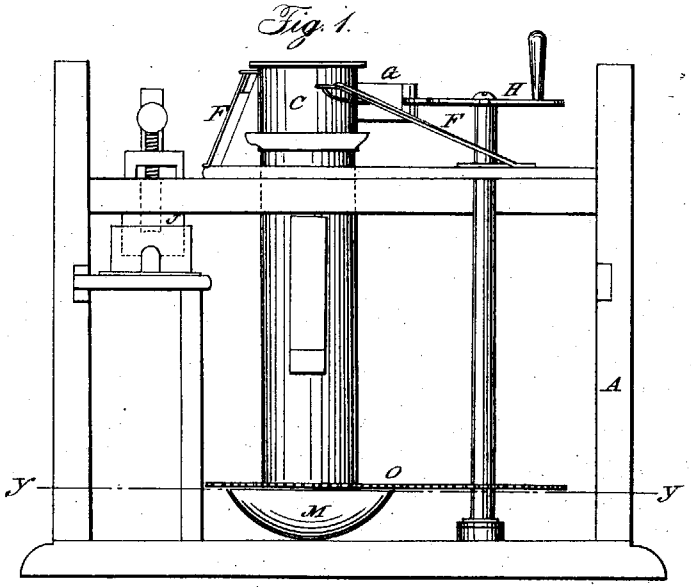
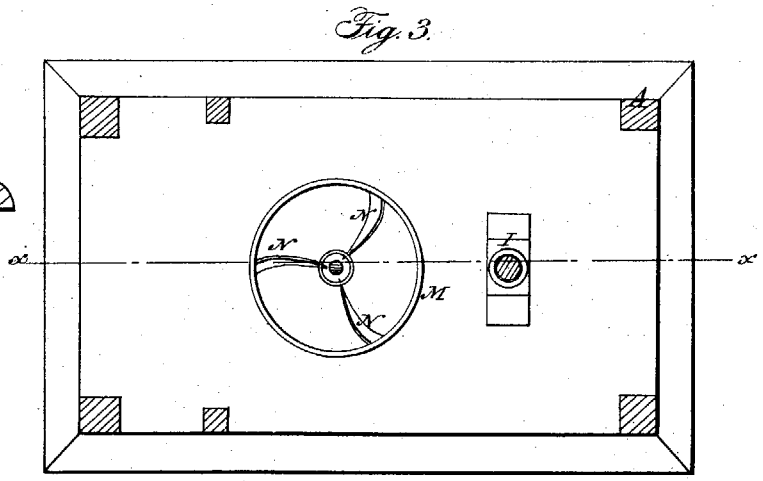
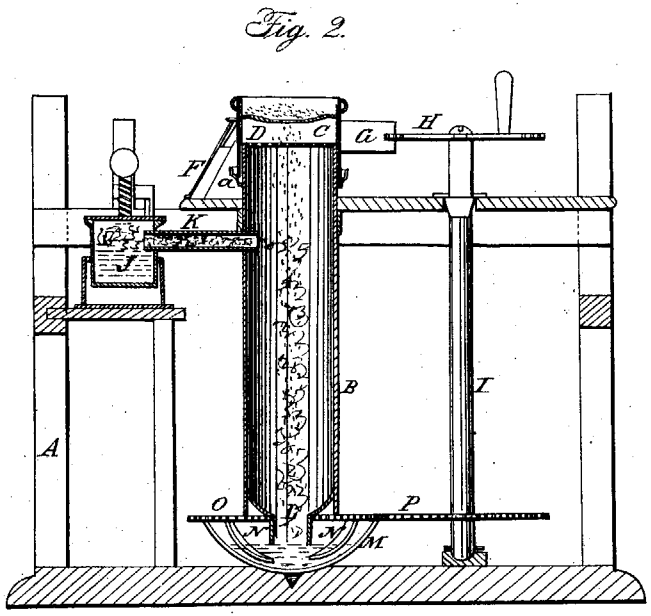
Witnesses:
Robert Kinnen
Lemuel Kidridge
Inventor:
J. W. Worthington
Austin G. Day
Per their attorney
A. H. Gale
AM. PHOTO-LITHO. CO. N.Y. (OSBORNE'S PROCESS.)

UNITED STATES PATENT OFFICE.

HENRY W. ADAMS, OF NEW YORK, AND W. S. WORTHINGTON, OF NEWTON, N. Y.

IMPROVEMENT IN AMALGAMATING AND COLLECTING GOLD AND SILVER.

Specification forming part of Letters Patent No. 41,588, dated February 16, 1864; antedated February 12, 1864; Reissue No. 2,028, dated July 18, 1865.

*To all whom it may concern:*

Be it known that HENRY W. ADAMS, of the city, county, and State of New York, and WM. S. WORTHINGTON, of Newton, in the county of Queens and State of New York, have invented certain new and useful Improvements in the Amalgamation of Gold and Silver with Quicksilver; and we hereby declare that the following is a full and sufficient description of the same, reference being had to the accompanying drawings and references marked thereon.

Figure 1 is a side elevation of our amalgamating cylinder and apparatus. Fig. 2 is a vertical section through line *x x* of Fig. 3. Fig. 3 is a horizontal section of the same through line *y y* of Fig. 2.

Similar letters of reference indicate similar devices in all the drawings.

The invention set forth herein covers a method of amalgamating the precious metals—gold and silver—but which applies more especially to gold, from the fact that the gold, whether in a sulphuret or the pure metal, undergoes a perfect solution by means of the process in the quicksilver; but in order that the amalgamating action shall be quick and penetrating on the auriferous mineral the mineral must be reduced to a very fine powder and the metal brought into contact with the said powder while the metal is in the state of vapor in a suitable heating-vessel. As it is inconvenient, if not impracticable, to heat a very large body of mineral at once, it is found necessary that the mineral be fed in regularly, so that the process of heating shall be continuous in the heater, and that the delivery of the quicksilver vapor in the heater shall also be continuous. The indispensable conditions of the process are therefore the continuous traveling motion of the constantly-heated pulverulent mineral through the heater simultaneously charged with the vapor of quicksilver. The language of the caveat, which is here quoted, shows clearly and emphatically what the patentees regarded as their invention. They say: "Claiming, as we do, the discovery of the great utility of mixing with or exposing to each other gold and silver bearing quartz in a pulverulent, sifted and moving, floating, falling, or resting state, in a close chamber, cylinder, or otherwise, and the hot vapor of distilled quicksilver, that both may intermingle in an atmosphere of each other and effect by this intermingling an absolute contact of particle with particle, gives a certain and perfect amalgamation of all the precious metals with quicksilver." Therefore it is that the invention does not consist in the form nor in the position of the heating-vessel. It may be globular, egg form, cylindrical, or of any other shape. The cylinder may be placed on its side, on its end, or obliquely on an inclined plane. The great features of the invention are exhausted when we have brought into contact the cloud of mineral dust with the cloud of metallic vapor, both at a suitably-elevated temperature, in a close chamber of the proper temperature for amalgamation.

We have used a cylinder in the vertical position, we have used one in the horizontal position, and we have used one in the inclined position. Each has its advantages and its disadvantages. We have figured the vertical cylinder and have used that the most, although we do not intend to be confined to that particular position of the heater, nor to that form. So far as we know, we were the first to use the process of bringing together a cloud of metallic dust and metallic vapor in a traveling heated condition for the purpose of amalgamating the two as preliminary to the separating of the gold, the whole operation being performed in a close and heated chamber. If this view be correct, we are entitled to claim the process substantially as set forth.

To enable those skilled in the arts to understand and use our invention, we proceed to describe an apparatus which will represent one of the modes of verifying the process.

In the drawings, let A represent a framework, which may be constructed in any suitable manner to support the working parts.

B is a working stationary cylinder in the vertical position within said frame, and has a short cylinder, C, fitted on its upper end, so that it may turn freely thereon, the cylinder C being provided with a screen, D, and hopper E. (Shown in Fig. 2.) The lower end of cylinder C is fitted into an annular chamber, *a*, on the outer face of cylinder B, and said chamber *a* is filled with water, forming a water-tight joint.

This movable cylinder C has springs F attached to it, and it is also provided with a horizontal arm, G, acted upon by a wiper-wheel, H, at the upper end of a vertical shaft, I, in the frame A. The action of this wiper-wheel on the arm G, in connection with the springs F, gives a rotary shaking movement to cylinder C and screen D within it.

J represents a furnace or still for distilling the quicksilver. This furnace communicates with cylinder B a short distance below screen D by means of tube K. The lower end of cylinder B terminates in a short funnel, L, extending down into a pan, M, of suitable dimensions, and directly underneath the cylinder B.

N represents stirrers working within pan M, and are attached to a toothed wheel, O, which works on the top of the pan M and gears into a toothed wheel, P, which is on the lower portion of shaft I. The stirrers N receive a rotary motion within the pan M through the medium of the gearing O P. The pulverized mineral is placed in the cylinder C, and by the motion communicated to the latter is shaken through the screen D, falling in a shower through cylinder B, the vapor of quicksilver coming in contact with the fine particles of the precious metal and amalgamating therewith. Should any particles of the metal escape amalgamation within the cylinder B, they, with the condensed quicksilver, pass into the pan M, and the amalgamation will be completed within the pan, the stirrers N serving to bring the quicksilver and precious metal into contact. The refuse is washed out from the pan M at its top, and the water which is admitted into the pan for this purpose serves as a seal to prevent any of the vapor of quicksilver from escaping at the bottom of the cylinder B. This seal, together with that formed by the chamber *a*, which receives the lower end of screen-cylinder B, are important, for, the vapor of quicksilver being injurious, fatal consequences might ensue to the workmen if the escape of the vapor were not prevented. The stirrers N may be arranged to be stationary and the pan rotate; but the result would be the same in both cases. Absolute contact of the quicksilver and the gold, both being in the state of transfer or traveling through the heated vessel together, with the amount of heat to sustain the quicksilver in the state of vapor, are indispensable. To secure the full and free action of the amalgamating-cylinder on the ingredients within, the cylinder should be kept at 700° of Fahrenheit.

The pan M may be heated by an extra fire in case it were found necessary to have more heat than that furnished to the cylinder B by the means already provided.

Having set forth the nature of the invention and the several modes of using the same as contemplated by us and required to be described in accordance with the 6th section of the act of 1836, we proceed to state we are aware that an amalgamation has been attempted by placing quicksilver and pulverized auriferous quartz in a vessel and exposing the mass to heat sufficient to vaporize the quicksilver and cause it to pass through the quartz. This process we distinctly disclaim; but

What we claim as our invention, and desire to secure by Letters Patent, is—

The process of amalgamating the precious metals by bringing their mineral matter, in the state of a dust, into contact with the vapor of quicksilver during their passage through the heating-vessel, substantially in the manner and for the purpose herein set forth.

W. S. WORTHINGTON.
AUSTIN G. DAY.

Witnesses:
GEO. V. HAND.
D. M. DOUGHTY.